United States Patent

[11] 3,573,615

| [72] | Inventors | Dan I. Porat;<br>Robert L. Anderson, Palo Alto, Calif. |
|---|---|---|
| [21] | Appl. No. | 668,303 |
| [22] | Filed | Sept. 14, 1967 |
| [45] | Patented | Apr. 6, 1971 |
| [73] | Assignee | The United States of America as represented by the United States Atomic Energy Commission |

[54] SYSTEM FOR MEASURING A PULSE CHARGE
5 Claims, 3 Drawing Figs.

[52] U.S. Cl.......................................... 324/111,
324/102, 328/58
[51] Int. Cl......................................... G01r 1/00,
G01r 19/00
[50] Field of Search.......................................... 324/111,
102, 123, 99; 328/58, 116, 151, 127; 330/20
(Cursory); 250/(Inquired)

[56] References Cited
UNITED STATES PATENTS

| 2,419,340 | 4/1947 | Easton | 328/58 |
|---|---|---|---|
| 2,566,827 | 9/1951 | Dean et al. | 328/58 |
| 2,688,697 | 9/1954 | Lawson et al. | 328/58 |
| 2,810,828 | 10/1957 | Gray et al. | 328/116 |
| 2,892,083 | 6/1959 | Norris | 328/58 |
| 3,439,271 | 4/1969 | Metcalf et al. | 324/99 |
| 2,585,077 | 2/1952 | Barney | 330/20 |
| 3,316,547 | 4/1967 | Ammann | 324/99X |

*Primary Examiner*—Rudolph V. Rolinec
*Assistant Examiner*—Ernest F. Karlsen
*Attorney*—Roland A. Anderson

ABSTRACT: A circuit operable in response to a low-power nanosecond input pulse for developing an output pulse having a peak voltage proportional to the total charge of the input pulse. The input pulse is applied through a normally conducting transistor to a storage capacitor, which is discharged through a resistor to drive an amplifier over a decay period on the order of 50 times the period of the input pulse. The amplifier output pulse is applied to a second storage capacitor and discharge resistor circuit to produce an output pulse that has a rise time equal to the input pulse period plus the decay period of the first storage circuit and a fall time equal to the decay period of the second storage circuit.

Patented April 6, 1971

INVENTORS.
ROBERT L. ANDERSON
BY DAN I. PORAT

ATTORNEY.

INVENTORS.
ROBERT L. ANDERSON
BY DAN I. PORAT

ATTORNEY

SYSTEM FOR MEASURING A PULSE CHARGE

BACKGROUND OF THE INVENTION

This invention relates to pulse charge detecting circuits, and more particularly, it pertains to circuits that generate an output pulse having a peak voltage proportional to the total charge of an input pulse.

The invention disclosed herein was made under, or in, the course of Contract No. AT(04–3)–400 with the United States Atomic Energy Commission.

Generally, peak voltage amplifying and stretching circuits form a part of known systems used for analysis of charged particles. In such systems, the charged particles activate a scintillator to radiate flashes of light which stimulate a photomultiplier to produce corresponding electric pulses. Each pulse is assumed to have a height that is proportional to the energy loss of the particle initiating the pulse. The number of particles and their energy, therefore, may be determined by applying the pulses to a pulse height analyzer. Prior to application of the pulses to the analyzer, the pulses are stretched and amplified. Then, with the analyzer, the pulses are differentiated by height, and all pulses that fall within given ranges of pulse height are counted. Thus, a spectrum, by number and energy, of the particles that impinge on the scintillator is available at the output of the pulse height analyzer.

The accuracy of the spectrum is a function of the proportion of pulses having heights that are in fact proportional to the energy loss of the initiating particles. It is found, however, that pulses of various shapes and pulse heights may be initiated by particles that undergo equal energy loss. This effect may arise because the particles traverse different parts of the scintillator and therefore have different light collection paths and reflections. Furthermore, noise may be superimposed on the pulses so that their peaks are an erroneous measure of the energy loss of the initiating particles. Thus, a system in which the peaks of the pulses from the photomultiplier are amplified and stretched prior to application to the pulse height analyzer is subject to error because of noise peaks and the variations in pulse shape and heights.

A more accurate indication of the energy loss of particles impinging on the scintillator may be obtained by accumulating the total charge of each resulting photomultiplier pulse. The total charge is proportional to the energy loss of the initiating particle and therefore may be utilized to obtain an accurately proportional output pulse suitable for application to a pulse height analyzer.

SUMMARY OF THE INVENTION

According to the present invention, substantially the entire charge of an input pulse is applied through an active conductance means to a charge storage means. At the conclusion of the input pulse, the accumulated charge is discharged into amplifying means over a period that is long compared with the input pulse period. Since the voltage of the total charge accumulated in the charge storage means is proportional to the total charge of the input pulse and not to the peak voltage, the amplifying means is driven to produce an output pulse having a peak voltage that is also proportional to the total charge of the input pulse. Output pulses are obtained thereby that have peaks that are closely proportional to the total charge of the corresponding input pulse, regardless of the input pulse shape. Furthermore, the total charge present in noise spikes that may be imposed on the input pulse is insignificant as compared to the total charge of the input pulse, so that the output pulse is relatively insensitive to noise.

It is an object of the invention to measure the total charge of an electric pulse of short duration.

Another object is to accurately indicate the spectrum of charged particles from a radioactive source.

It is another object of the invention to generate an output pulse having an amplitude proportional to the total charge on an input pulse susceptible to noise and pulse shape variations.

Another object of the invention is to utilize charge storage circuits under control of active elements to produce a microsecond output pulse proportional to the total charge of a low-power nanosecond input pulse.

Other objects and advantageous features of the invention will be apparent in a description of a specific embodiment thereof, given by way of example only, to enable one skilled in the art to readily practice the invention, and described hereinafter with reference to the accompanying drawing.

DESCRIPTION OF AN EMBODIMENT

Figure 1:
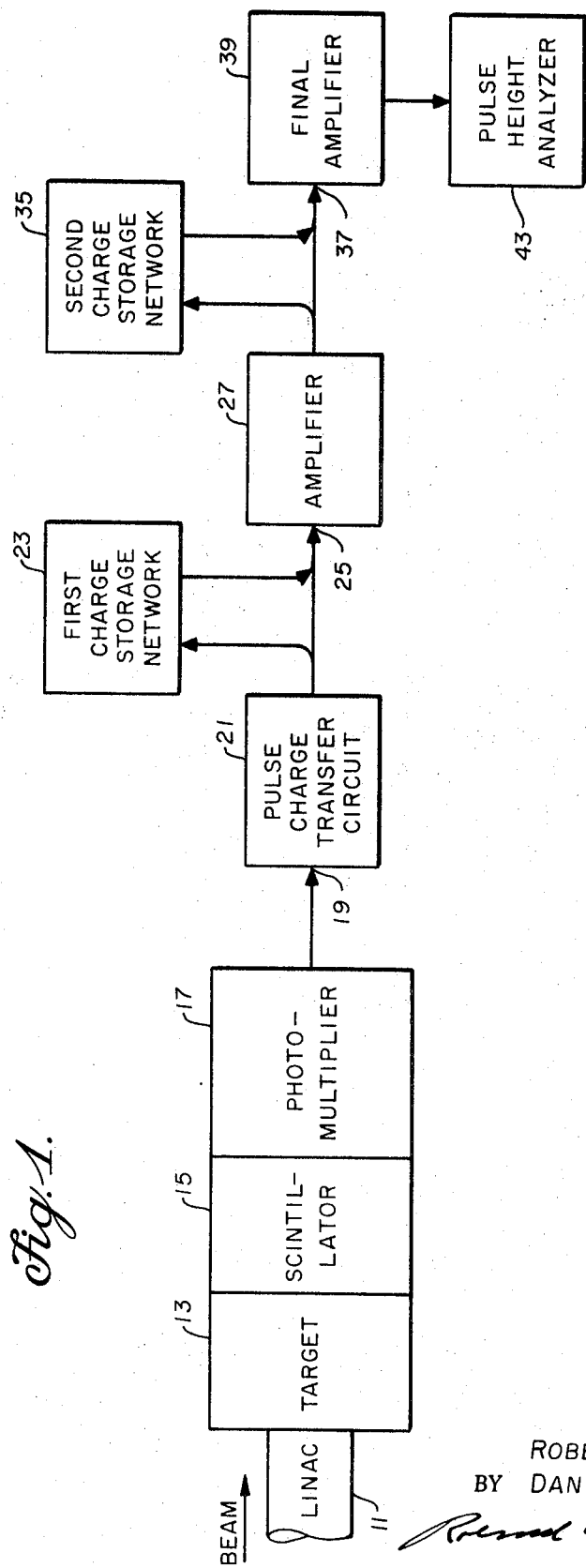
FIG. 1 is a block diagram of a system for measuring pulse charges initiated by charged particles from a radioactive source impinging on a scintillator.

The invention may be especially useful in a system for analyzing the energy spectrum of charged particles produced during nuclear experiments. For example, in FIG. 1 is shown a system in which a primary electron beam from a linear accelerator 11 is used to bombard a target 13 to produce charged secondary particles. The charged secondary particles impinge upon a scintillator 15 situated adjacent the target. Each impinging particle causes the scintillator to luminesce and produce one scintillation or flash of light for each particle. The intensity of each flash is proportional to the energy loss of the particle in the scintillator. The flashes may be picked up and converted to electrical pulses of proportional energy by a photomultiplier 17 adjacent the scintillator. The total energy of each photomultiplier pulse, therefore, is closely proportional to the energy loss of the secondary charged particle which impinges on the scintillator to initiate the pulse. Each initiating secondary particle produces a corresponding electrical pulse which is applied to an input 19 of a pulse charge transfer circuit 21. The circuit 21 presents a very low impedance to each pulse and transfers substantially the entire charge of the pulse to a first charge storage network 23 to develop a voltage pulse therein. Specifically, the input impedance of the circuit 21 may be made 50 ohms so that a matched coaxial cable can be used in transmitting the nanosecond signals over long distances as required for high-energy accelerators. The circuit 21 presents a very high impedance from the network 23 to the input 19, thereby retaining the charge within the network 23. A small portion of the charge of each photomultiplier pulse is also applied to an input 25 of an amplifier 27, driving the amplifier with the same voltage pulse that is developed in the network 23 as a result of the charge of the photomultiplier pulse. At the end of the photomultiplier pulse, the charge stored in the network 23 is applied to the input 25 of amplifier 27 over a decay period that d1 long compared to the initiating pulse, thereby causing convenience amplifier 27 to continue to be driven over the decay period near a voltage proportional to the total charge 50 the photomultiplier pulse. To illustrate this operation, reference is made to FIG. 2 where there is shown an idealized photomultiplier pulse 29, given as an example only, having a period $t_{in}$. This pulse is applied to the input 19. As mentioned before, a voltage pulse is developed in the charge storage network 23. The amplitude of this voltage pulse increases linearly in response to the idealized photomultiplier pulse 29. At the end of the period $t_{in}$, the voltage pulse in network 23 starts decaying with a time constant determined by the values of the components of network 23. The resulting pulse at input 25 may be represented by an idealized waveform 31 (FIG. 2) in which the rise time of the pulse has a period corresponding to $t_{in}$ and a decay time that is indicated as $T_{dl}$. The periods $t_{in}$ and $T_{dl}$ are represented in the ratio shown for convenience of illustration only, while in practice the period $T_{dl}$ may be typically on the order of 50 times as long as the period $t_{in}$.

Figure 2:
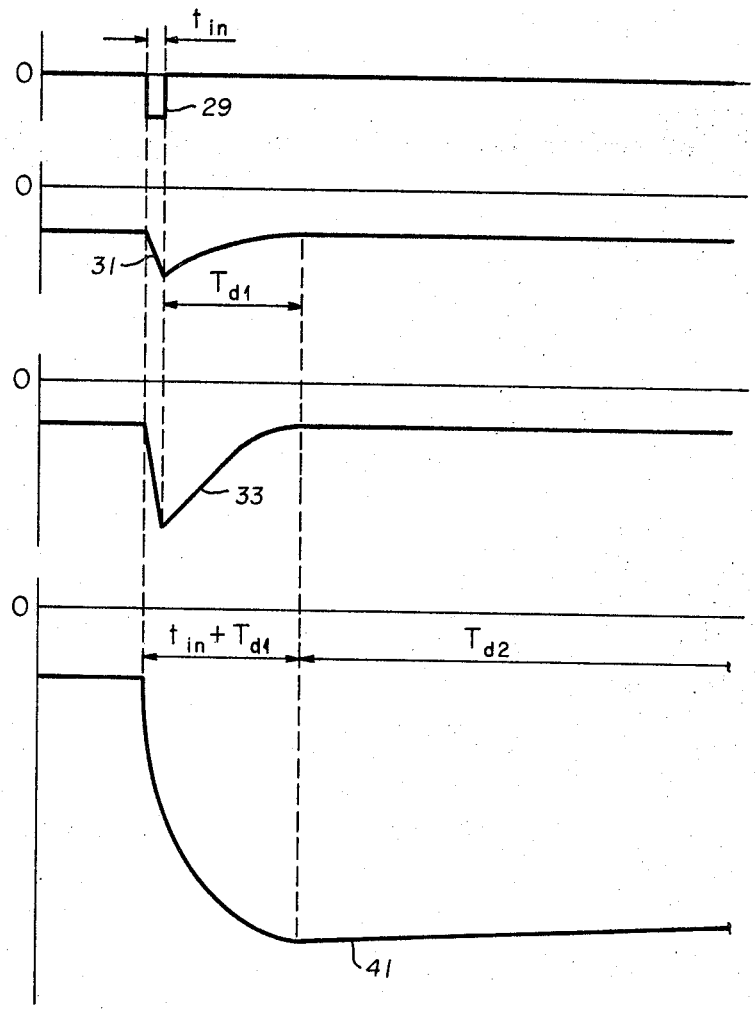
FIG. 2 is a waveform diagram of idealized pulse shapes at a successive series of points in the system shown in FIG. 1.

The amplifier 27 is driven by the pulse 31 to produce an amplified pulse 33 having the same period as pulse 31. Since the pulse 33 may be a very narrow pulse, typically in the range of tens or hundreds of nanoseconds; it is again advantageous to lengthen its duration of applying it to a second charge storage network 35. Substantially the entire charge of the pulse 33 is accumulated in the network 35, thereby producing an output pulse 41 having a rise time of $(t_{in}+T_{d2})$ and decay time $T_{d1}$ that is determined by the time constant of the components in the network 35. This decay time may be very long compared to the period of the pulse 33. The decay period of the pulse 41 is indicated as $T_{d2}$ in FIG. 2. The slopes and periods of the pulses 33 and 41 are shown in FIG. 2 for illustrative purposes only. The period $T_{d2}$ in practice is typically in the range of 50 times the period $(t_{in}+T_{d1})$. Since substantially the entire charge of the pulse 33 is accumulated in the network 35, the voltage of the accumulated charge is proportional to the energy loss of the initiating particle. The final amplifier 39 is operated in a linear mode, and is driven by the pulse 41 to produce an amplified output voltage that is proportional to the energy loss of the initiating pulse. This final output pulse is of a duration and energy level suitable for application to a pulse height analyzer 43. It will be observed that the pulse at the output of final amplifier has an amplitude that is proportional to the initiating particle due to the fact that amplification of all intermediate pulses is based on the total charge of the pulse to be amplified.

Figure 3:
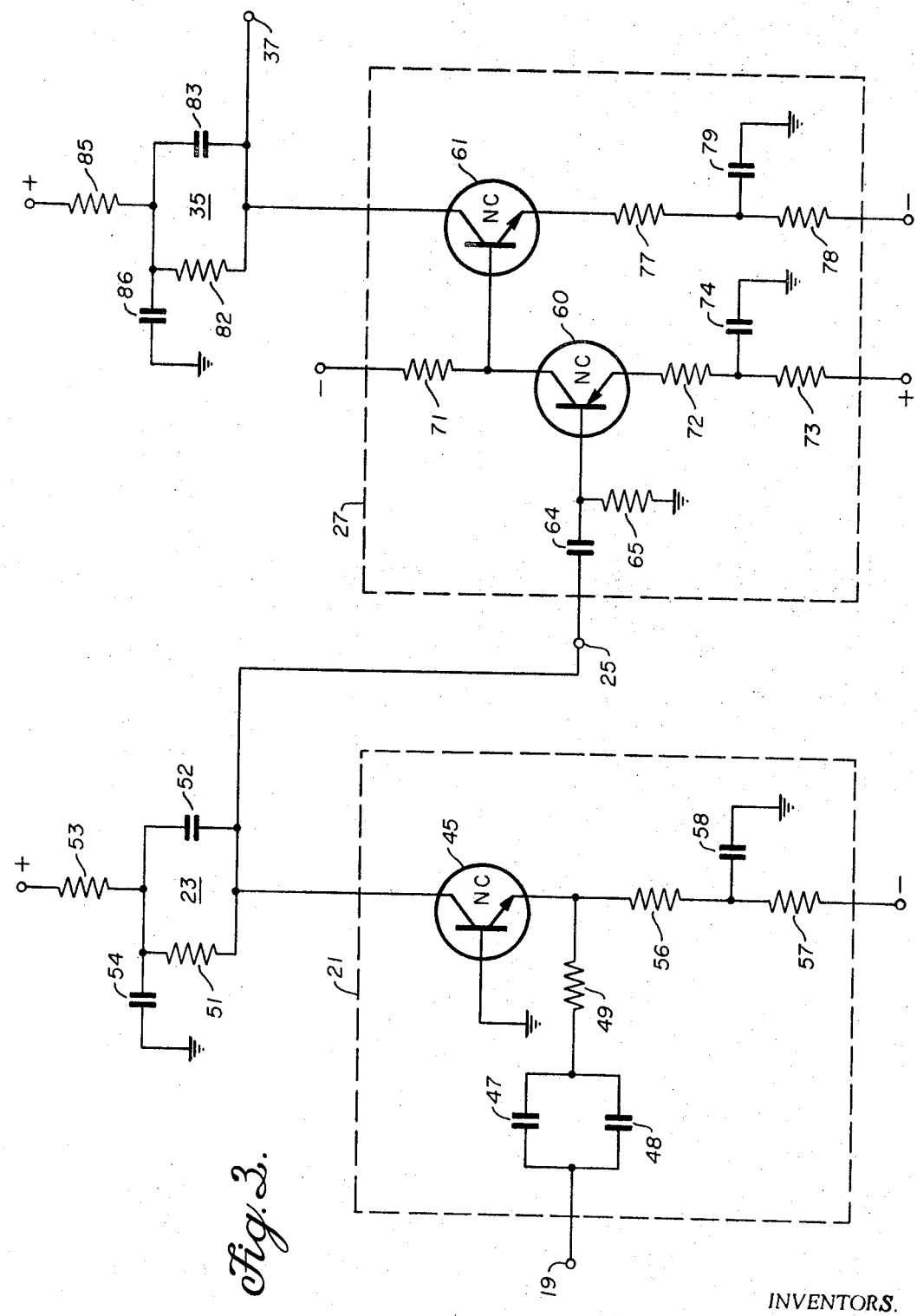
FIG. 3 is a schematic diagram of a portion of the system shown in FIG. 1.

More particularly, the invention may be described with reference to FIG. 3 in which certain portions of the system of FIG. 1 are shown schematically in detail. Photomultiplier pulses, as discussed hereinbefore, are applied to the input 19 of the pulse charge transfer circuit 21. The circuit 21 is an active circuit, and comprises a transistor 45 connected in a grounded-base configuration and biased to be normally conducting in a linear region. The input 19 is connected to the emitter of the transistor 45 through a pair of capacitors 47 and 48 connected together in parallel, in series with a resistor 49. The capacitors 47 and 48 comprise a wide band-pass network for transmission of the narrow photomultiplier pulses, and should be sufficiently large to avoid differentiation. Resistor 49 is an impedance matching resistor for terminating a coaxial cable from the photomultiplier to obtain optimum signal transfer without power reflections, the cable from the photomultiplier typically having a characteristic impedance of 50 ohms. The collector of the transistor 45 is connected to the first charge storage network 23, which is comprised of a resistor 51 and capacitor 52 connected in parallel. A decoupling network is also provided, and comprises a resistor 53 between a power supply and the network 23 and a capacitor 54 to ground from the connection between the resistor 53 and the network 23. Connected to the emitter of the transistor 45 is a high impedance limiting resistor 56 and in series therewith is a decoupling network comprising a resistor 57 to the power supply and a capacitor 58 to ground.

The total resistance in the emitter and collector circuits of the transistor 45 is made very high as compared to the resistance of the resistor 49. Consequently, upon application of a photomultiplier pulse to the terminal 19, the transistor 45 increases its conduction proportionately to transfer substantially the entire charge of the photomultiplier pulse to the capacitor 52. The relatively large value of resistor 51 prevents capacitor 52 from discharging rapidly. Since the photomultiplier pulse causes an increase in conduction in the region of normal conduction of the transistor 45, the transistor presents a very low forward impedance to the photomultiplier pulse. However, at the conclusion of the photomultiplier pulse, the charge accumulated on the capacitor 52 is prevented from leaking back to the emitter circuit of the transistor due to the high dynamic impedance of transistor 45. The transistor, therefore, functions similar to a diode. An important difference, however, is that the transistor operates in the linear region, whereas a diode would introduce nonlinearities when conduction therethrough diminishes toward cutoff.

Since the pulse 31 is developed in the charge storage network 23, the peak of the pulse 31 is proportional to the total charge accumulated on the capacitor 52, rather than to the peak amplitude of the pulse 29. The effect of any noise that may be superimposed on the pulse 29 or any other variations in the height or shape of the pulse 29 are thus eliminated. The pulse 31, however, may still be of relatively narrow width and of a low energy level. It is applied, therefore, to the amplifier 27 for further amplification and hence to the charge storage network 35 to lengthen the pulse duration.

The amplifier 27 includes a transistor 60 to which the pulse 31 is coupled from the input 25. The pulse 31 is applied to the base of the transistor 60 by means of an RC coupling network comprised of a capacitor 64 and a resistor 65. The transistor 60 is biased to be normally conducting in a linear range. A load resistor 71 is connected between the collector of the transistor 60 and the negative pole of the power source, while the emitter of the transistor is connected to a decoupling resistor 72 in series with negative feedback resistor 73 to the positive pole of the power source. A decoupling capacitor 74 is connected across the resistor 73 to ground. The collector of the transistor 60 is connected to the base of a transistor 61. The emitter of the transistor 61 is connected to the negative pole of the power source through a negative feedback resistor 77 and a decoupling resistor 78. A decoupling capacitor 79 is connected across the resistor 78 to ground. The collector of the transistor 61 is connected to the second charge storage network 35 which is comprised of a resistor 82 and a capacitor 83. The resistor 82 and capacitor 83 are connected in parallel between the collector of transistor 61 and a decoupling resistor 85 that is connected to the positive pole of the power source. A decoupling capacitor 86 is connected across the resistor 85 to ground.

Since the transistor 60 is biased to be normally in the conducting state, a bias voltage more positive than the negative supply is developed across the resistor 71 and applied to the base of the transistor 61. The transistor 61 is thereby also biased to be normally conducting.

Thus, upon application of the pulse 31 to the input 25, an amplified inverse pulse (not shown) is developed at the collector of transistor 60 and applied to the base of transistor 61. The transistor 61 is caused thereby to increase conduction to develop the pulse 33 at its collector. The charge of the pulse 33 is accumulated on capacitor 83, thereby developing the leading edge of the pulse 41.

The resistor 82 is chosen to provide a long decay period $(T_{d2})$ for discharge of capacitor 83 as compared to the period of the pulse 33 to thereby develop the trailing edge of the waveform 41.

The final amplifier 39 is a conventional stable gain amplifier utilizing negative feedback and operating in the linear region. The amplifier 39 is chosen to have a high input impedance to permit substantially the entire charge of the pulse through transistor 61 to be applied to, and accumulated on, the capacitor 83. The transistor 61 presents a high reverse impedance to the accumulated charge on capacitor 83 to preserve the charge for driving the final amplifier 39 to reproduce the pulse 41 at a higher power level.

Thus at the output of the final amplifier 39, pulses initiated by secondary particles in the scintillator 15 are obtained that are of a height and width suitable for application to the pulse height analyzer 43, and they are of a height that is closely proportional to the energy loss of the initiating particle, irrespective of variation of pulse shapes.

A system was built exemplifying the invention in which the pulse charge transfer circuit 21, the first charge storage network 23, the amplifier 27, and the second charge storage network 35 were comprised of representative components as follows:

| Transistors | Resistors | Capacitors |
|---|---|---|
| 45—2N918 | 49=47 ohms | 47=100 pf. |
| 60—2N2005A | 51=1.2 k ohms | 48=1 µf. |
| 61—2N918 | 53=300 ohms | 52=200 pf. |
| | 56=2.2 k ohms | 54=15 µf. |
| | 57=100 ohms | 58=15 µf. |

| Transistors | Resistors | Capacitors |
|---|---|---|
| | 65 = 10 k ohms | 64 = 0.1 μf. |
| | 71 = 1.5 k ohms | 74 = 2.2 μf. |
| | 72 = 220 ohms | 79 = 2.2 μf. |
| | 73 = 2.2 k ohms | 83 = 1 μf. |
| | 77 = 1 k ohm | 86 = 2.2 μf. |
| | 78 = 470 ohms | |
| | 82 = 2.2 k ohms | |
| | 85 = 100 ohms | |

In the system built, the following specifications were met: Maximum input—$1.2 \times 10^{-10}$ coulombs (typically 1 volt into 50 ohms, 6 nsec. duration); Output corresponding to maximum input—2 volts negative into 93 ohms; Input impedance—50 ohms; Rise time (10-90%)—0.3 microsecond; Decay time constant—2.0 microsecond; linearity of output pulses was found to be about 1% for input pulse widths varied from 1.6 to 19.6 nanoseconds, and for input pulse heights varied to produce output pulses from approximately 0.1 to 2.0 volts.

While an embodiment of the invention has been shown and described, further embodiments or combinations of those described herein will be apparent to those skilled in the art without departing from the spirit of the invention or from the scope of the appended claims.

We claim:

1. In a system for measuring the total charge of an input pulse having a period as short as 1 nanosecond by integration of the pulse current over the pulse period, the combination of:
   a. a power supply having a first pole and a second pole;
   b. first charge storage means including a capacitor;
   c. first active conductance means serially connected with said capacitor between said first and second poles, said first conductance means being comprised solely of a single active element, said conductance means having a low impedance input circuit for receiving said pulse, said first active conductance means being a transistor circuit including a transistor having an emitter, base and collector, said transistor circuit having a high impedance as viewed into the collector circuit and a low impedance as viewed into the emitter circuit, said pulse charge being applied to said emitter, and said collector being connected to said first charge storage means;
   d. means for biasing said conductance means to be normally conducting in its linear region;
   e. means for applying said input pulse to the input circuit of said conductance means for transfer of the total charge of said pulse to said capacitor for accumulation therein, said single active element being the sole active element between said applying means and said capacitor;
   f. first negative feedback means serially connected with said storage means and said conductance means for maintaining conduction of said conductance means in its linear region during the entire transfer of the charge of said pulse; and
   g. means for discharging said capacitor over a period greater than the period of said pulse, said discharge constituting a first discharge pulse having a peak amplitude that is proportional to the total charge of said input pulse, said discharging means including a resistor connected across said capacitor, said resistor having a value relative to the value of said capacitor such that the discharge period is in the range of 50 times said pulse period.

2. The combination of claim 1, wherein said transistor circuit is connected in a grounded-base configuration.

3. The combination of claim 1, wherein said first negative feedback means includes a resistor connected to the emitter of said transistor.

4. The combination of claim 1, further including:
   a. second charge storage means;
   second active conductance means serially connected with said second charge storage means between said first and second poes;
   c. means for biasing said second conductance means to be normally conducting in its linear region;
   d. means normally conducting in a linear region for amplifying said first discharge pulse, said amplifying means having a high impedance input circuit connected to said first charge storage means;
   e. means for applying said amplified discharge pulse from said amplifying means to said second conductance means for transfer of the total charge of said amplified discharge pulse to said second charge storage means for accumulation therein;
   f. second negative feedback means serially connected with said second storage means and said second conductance means for maintaining conduction of said second conductance means in its linear region during the transfer of the total charge of said amplified pulse; and
   g. means for discharging said second storage means over a period greater than the period of said first discharge pulse, the discharge of said second storage means constituting an output pulse having a peak amplitude that is proportional to the total charge of said input pulse.

5. The combination of claim 4, further including a photomultiplier for generating said input pulse, a pulse height analyzer, and means for applying said output pulse to said analyzer.